United States Patent [19]

Simms

[11] Patent Number: 5,003,004
[45] Date of Patent: Mar. 26, 1991

[54] TOUGH FLEXIBLE POLYMER BLENDS

[75] Inventor: John A. Simms, Wilmington, Del.

[73] Assignee: E. I. Du Pont de Nemours and Company, Wilmington, Del.

[21] Appl. No.: 262,297

[22] Filed: Oct. 25, 1988

Related U.S. Application Data

[63] Continuation of Ser. No. 36,098, Apr. 8, 1987, which is a continuation-in-part of Ser. No. 853,424, Apr. 18, 1986, abandoned.

[51] Int. Cl.[5] .................... C08L 61/04; C08L 51/00; C08L 33/04; B32B 27/40
[52] U.S. Cl. ..................... 525/68; 525/81; 525/125; 525/127; 525/162; 525/64; 525/66; 525/74; 525/67; 524/91; 428/424.4
[58] Field of Search .................. 525/68, 125, 127, 162

[56] References Cited

U.S. PATENT DOCUMENTS

| | | | |
|---|---|---|---|
| 4,048,254 | 9/1977 | Hilliev et al. | 525/89 |
| 4,417,034 | 11/1983 | Webster | 526/190 |
| 4,659,783 | 4/1987 | Spinelli | 525/293 |

OTHER PUBLICATIONS

International Publication WO86/00626, Spinelli, Published, Jan. 30,1986.

*Primary Examiner*—Melvyn I. Marquis
*Assistant Examiner*—Vasu S. Jagannathan
*Attorney, Agent, or Firm*—Charles J. Shoaf

[57] ABSTRACT

A blend of a softer continuous phase polymer reinforced with harder acrylic star polymer particles having reactive functional groups with crosslinking ability built in or provided by a third polymer. The harder polymer has a $T_g$ at least 10° C. above that of the softer polymer, and the acrylic star polymer is preferably made by group transfer polymerization. This blend provides coating compositions, films and bulk polymer with enhanced toughness and flexibility.

16 Claims, No Drawings

TOUGH FLEXIBLE POLYMER BLENDS

CROSS REFERENCE TO RELATED APPLICATION

This is a continuation of application Ser. No. 07/036,098, filed April 8, 1987, which was a continuation-in-part of application Ser. No. 853,424, filed April 18, 1986, now abandoned.

BACKGROUND OF THE INVENTION

This invention concerns a multiphase polymer blend which is tough and flexible. More particularly, it concerns such a blend in the form of particles of harder polymer in a continuous matrix of softer polymer.

Flexible finishes can be grouped in two broad classes, acrylic-containing and nonacrylic. This invention relates to flexible finishes containing a substantial amount of acrylic resin, by far the smaller group of materials because of the well known observation that acrylic polymers are generally hard and brittle, or soft and weak.

The advantages of acrylic polymers with respect to outdoor durability, ease of manufacture and relatively low cost continues to make it desirable to seek routes to use them in flexible finishes. Two approaches have emerged in the past, blending and modification by grafting for example to make acrylourethanes, as in U.S. Pat. Nos. 4,208,495, 4,208,494, 4,143,091, 4,034,017, 3,975,457, and U.S. Pat. No. 3,919,351. The grafting approaches also include modification of a hydroxy acrylic with caprolactone to produce hydroxyester side chains, A. N. Theodore and M. S. Chattha, J. Coatings Technology, vol. 54, #693, pp. 77-81 (1982).

Previous attempts to achieve flexibility by blending of acrylic polymers have involved crosslinked blends of two acrylics of moderate molecular weight, for example U.S. Pat. No. 3,773,710—Victorius (Nov. 20, 1973) or in crosslinked blends of low molecular weight polyester with moderate molecular weight acrylic polyol in U.S. Pat. No. 4,076,766—Simms (Feb. 28, 1978). In this latter patent the concept of improving the low temperature flexibility of the film by using a low glass transition temperature polyester polyol coreactant with the acrylic polyol is exploited, but the resultant films lack hardness. This is thought to be due to the selection of a relatively low molecular weight acrylic polyol for the coating to avoid application problems such as web formation seen when high molecular weight acrylic polymers are used in coatings, and to achieve more than 20% by weight application solids. This causes incomplete or no phase separation upon crosslinking. Even if molecular weights were selected to give better phase separation, application properties are not as good as might be desired. A high degree of phase separation is now thought to be necessary for maximum hardness with flexibility in these blends, but concomitant with phase separation often is haze or loss of transparency which can vitiate a product for various purposes.

Other work on tough, flexible finishes which can be used both on metal and flexible plastic or rubber is illustrated by U.S. Pat. No. 4,548,998 on combinations of polyurethanepolyol and a curing agent, U.S. Pat. No. 4,545,132 on polyesterpolyol and curing agent, U.S. Pat. No. 3,882,189 on polyesterurethanepolyol and curing agent, U.S. Pat. Nos. 3,954,899 and 3,962,522 on polyester, polyurethanepolyol and curing agent, and U.S. Pat. No. 4,419,407 on polyesterpolyol, polyurethanepolyol and curing agent. While these inventions may produce tough, flexible finishes, they neither have the functional advantages of acrylic-containing finishes nor provide an optimum balance of mechanical properties.

U.S. Pat. No. 4,180,613—Vissiliou (Dec. 25, 1979), discloses the use of tough and relatively sticky particles in a hard matrix of silicone resins to minimize crack propagation and permit making a thicker coating without mud crack formation on drying.

U.S. Pat. No. 4,468,492—Piccirilli (Aug. 28, 1984), is another example of using a relatively hard matrix or film-forming phase with a soft second phase blended in, e.g., acrylic lacquer film formers with a $T_g$ above 25° C. blended with siloxane-substituted materials with a $T_g$ below $-5°$ C.

Group transfer polymerization is established as a useful technique for preparing acrylic polymers of prescribed architecture and narrow molecular weight. It is particularly useful in making multi-armed stars with narrow-polydispersity of molecular weight of the arms themselves and of the stars with attached arms. See. U.S. Ser. No. 627,913 and 627,919, both filed July 5, 1984, and related PCT International Publication WO86/00626—Spinelli, published Jan. 30, 1986, and the references cited therein.

The patents, applications and articles cited above are incorporated herein by reference for a fuller disclosure and understanding of the state of the art and the background of this invention.

Enamel paints with an acrylic resin and an acrylic star polymer (without OH groups in the arms) are disclosed in Ex. 23, and stars with hydroxyl-containing arms are disclosed in Ex. 2 of the WO publication.

The resulting enamel would not have the degree of toughness and flexibility needed for use in a unitary clear coat over both base-coated metal and rubber parts of an automobile.

SUMMARY OF THE INVENTION

The present invention provides a blend of at least two polymers, comprising about, by weight of blend solids.

(A) 10-60% of at least one acrylic star polymer comprising a crosslinked core which comprise
  (i) a polymer derived from a mixture comprising
    (a) 1-100% by weight of one or more monomers, each having at least two groups,

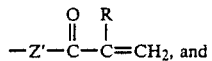

(b) 0-99% by weight of one or more monomers, each having one group

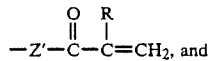

(ii) attached to the core, at least 5 arms comprising polymer chains derived from one or more monomers, each having one group,

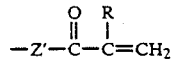

in each of which R is the same of different and is H, $CH_3$, $CH_3CH_2$, CN or $CO_2R'$ and Z' is O or NR', wherein R' is $C_{1-4}$ alkyl, wherein said arms contain reactive functional groups in an amount of at least about one such group per arm on the average, said star polymer having a primary glass transition temperature above 20° C.;

(B) 15–60% of at least one matrix-forming polymer selected from polyester, polyether, acrylic, epoxy acrylic and hydrocarbon resins, polyurethanes, polycaprolactones, polycarbonates and polysiloxanes different than that of polymer (A) and having a primary glass transition temperature below 10° C., a number average molecular weight of at least about 500, and a functionality of at least 2; and (C) said blend having crosslinking capability, either in polymers (A) and (B), or in third, crosslinking polymer.

Preferably the difference in primary glass transition temperature between polymers (A) and (B) is at least 45° C.

These blends are useful in tough and flexible enamel paints, films, foams and molding resins, and they are particularly attractive as cured coatings on substrates.

Preferably, the acrylic star polymers of (A) are made by group transfer polymerization, more preferably by an arm/core process wherein acrylic stars polymer (A) is made by an arm/core process comprising (A) preparing a "living" polymer by reacting a group transfer initiator with one or more monomers having a carbon-carbon double bond polymerizable by a group transfer polymerization process;

(B) contacting the resulting "living" polymers with a mixture comprising
  i. 1–100% by weight of a monomer having at least two carbon-carbon double bonds polymerizable by a group transfer polymerization process and optionally
  ii. 0–99% by weight of a monomer having one carbon-carbon double bond polymerizable by a group transfer polymerization process.

An arm/core/arm process may be preferred for some purposes.

Parts, percentages and proportions herein are by weight and molecular weights are by number average, except where indicated otherwise.

DETAILED DESCRIPTION

In attempts to achieve tough flexible polymers, especially reinforced elastomeric finishes with large amounts of acrylics for durability, it has now been found that the limitations due to molecular weight of the acrylic polyol can be essentially overcome by using highly branched acrylic polymers which can reasonably be referred to as functional star polymers. These polymer blends contain from about 15 to 60% of an acrylic of such high molecular weight that it remains as a second phase in the cured film and with at least on $T_g$ above use temperature, leading to reinforcement of the other, usually soft and elastic phase. The branches of the new star polymers are below the entanglement molecular weight for the acrylic, leading to relatively low solution viscosity and web free spraying, yet in the cured film the benefits of high molecular weight such as phase separation and reinforcing ability are retained.

It is possible that the star and soft phases both contain the same groups and that they become coreactive in the presence of a catalyst. Oxirane copolymerized in the presence of acid, or trialkoxysilyl which coreacts in the presence of water are suitable. If the crosslinking polymer is a separate polymer, it can be one such as an isocyanate or a melamine formaldehyde polymer.

The preferred star may contain both terminal and randomly placed functional groups. It may be most economical, but possibly not optimum to have the functional groups only on the outer end of the arm.

The flexible enamel vehicle of the invention is reinforced, i.e., toughened, by means of a functionally substituted acrylic star polymer preferably made by group transfer polymerization techniques, described in the above-identified WO patent publication, and summarized below and later in this specification.

Group transfer polymerization is a process in which the polymerization of monomers having carbon-carbon double bonds is initiated by certain initiators of the formula Q–Z, wherein Z is an activating substituent that becomes attached to one end of the growing polymer molecule and where Q is a group that continuously transfers to the other end of the growing polymer molecule as more monomer is added. The group Q is thus an active site than can initiate further polymerization of more monomer. The polymer molecule having the group Q is referred to as a "living" polymer, ad the group Q as a "living" group-transfer-initiating site.

Details of the group transfer polymerization process as it is applied to the preparation of large acrylic star polymers can be found in the aforementioned WO patent publication. The acrylic star polymers prepared by this method comprise (a) a core derived from a multifunctional monomer having at least two polymerizable double bonds, e.g., a di- or triacrylate or di- or trimethacrylate; (b) at least five polymeric arms attached to the core, e.g., polymer chains derived from a methacrylate polymer; and (c) "living" group transfer sites, e.g., the $-Si(CH_3)_3$ group, on the core and/or the arms. The "living" polymer may be deactivated, if desired, by contacting it with an active proton source such as an alcohol or water. In the aforementioned WO patent publication, various core-forming and arm-forming monomers, group transfer initiators, and catalysts are described as well as arm-first, core-first, and arm-core-arm techniques for preparing the star polymers. Preferably, arm-first techniques are used in the present invention.

The present invention involves the discovery that acrylic star polymers which bear reactive groups such as hydroxyl, carboxyl, epoxy, trialkoxysilyl, primary and secondary amino, hydroxyamide, alkoxyamide, i.e., groups capable of reacting with themselves, or with appropriate crosslinking agents such as nitrogen resins or di- and polyisocyanates, or flexible coreactants and preferably hydroxyl groups randomly and/or terminally situated along the star arms, are capable of reinforcing or enhancing the toughness of soft, flexible binders for enamels, resulting in blend compositions having a substantially improved hardness/flexibility balance over a wide range of temperatures. The ability of star polymers, even at concentration levels as low as 10–15% based on film weight, to reinforce such binders without deleteriously affecting the coating's flexibility has been found not to be a characteristic of star polymers in general, but rather to be dependent upon the presence of the described reactive groups therein. Star polymers having no functionality lead to blend embrittlement. Moreover, the favorable hardness/flexibility balance achieved with the blend coatings vehicles of the invention has not been found in crosslinked star polymers per se, but requires a blend of two components having two different glass transition temperatures. While it is not intended that this invention be limited by theoretical considerations, it is believed that the unique properties achieved with blend vehicles containing substituted star polymers are due to the high degree of uniformity of dispersion of a relatively hard dispersed phase in a softer continuous phase. Much prior effort in two-phase materials concerns the well-known rubber-toughened plastics which have a soft elastomeric internal phase within a continuous phase of higher-modulus material. There is evidence that blends containing substituted star polymers have a two-phase structure wherein rigid internal inclusions are present in a continuous rubbery matrix.

Toughness is a different parameter than softness. One material can be softer than another, yet still be more brittle. When a particulate phase is tougher than and adherent to the matrix, cracks forming in the matrix tend to be stopped and the stresses absorbed in the particles. Toughness is the tendency to resist the formation and propagation of cracks and can be defined as the property of absorbing energy before fracture. With consolidated bodies rather than coatings, it is usually represented by the area under a stress-strain curve, usually measured in K joules/m$^2$. Toughness involves both ductility and strength and thus is the opposite of the combined parameters of brittleness and lack of strength. Although the concept of toughness is more often encountered in the arts and sciences of consolidated materials such as molding resins, or metal sheet and bar, it is helpful in understanding the behavior of coatings, particularly in the context of the present invention.

Various tests can be used to determine the relative toughness of a material. The most relevant tests for purposes of the present invention are tests which show the relative degree of toughness in a coating. Thus, a suitable test would be forming a coating of the material to be tested on a glass substrate which has been soaped and rinsed, leaving a soap film residue. The coating can then be floated or peeled off the substrate and a stress-strain curve obtained by a tensile test of the coating itself.

The glass transition temperature or $T_g$ is one of the most important characteristics of amorphous (as contrasted to crystalline) polymers. Amorphous polymers which are crosslinked and have only one $T_g$ which is the rule when the material contains only one phase, will be hard and tough only in the narrow transition region between glass and rubber behavior. This range is usually no more than about 20° C. wide, so this normally limits coatings to behavior that is either glassy or rubbery or they undergo a major change in hardness in their use temperature range, which is not desirable. Nonacrylic polymers can partly circumvent this difficulty by using strong, noncovalent bonds between chains to increase their hardness in the rubbery plateau. Thus polyureas and polyurethanes can be fairly hard rubbers and for this reason have been candidates for use in coatings for both metal and rubber. Acrylic-containing systems on the other hand do not offer the opportunity for strong, noncovalent bonds between chains. In the present invention, the presence of two phases is used to broaden the area of tough, flexible behavior. The film is flexible when the use temperature is above the glass transition of either phase, and is relatively hard and tough when it is used below the glass transition of the higher $T_g$ phase, but above the lower $T_g$.

In the present invention, the major or primary $T_g$ of the higher phase should be above about 20° C., preferably above about 35° C. This "primary" distinction is made because a minor or secondary $T_g$ above 150° C. is sometimes observed with these star polymers. The $T_g$ above 150° C. is probably associated with the star core, which is such a small proportion of the star that it has only a minor influence on its ability to reinforce the coatings. Arm $T_g$ is considered to be the dominant factor in determining the transition that influences reinforcement. The lower $T_g$ should be below 10° C., preferably below −10° C. Thus, the difference between the transitions of the phases should be at least 10° C., preferably at least 45° C. The continuous phase should have the lower transition, preferably below −10° C. Differences of as much as 100° C. would probably be quite acceptable. There is probably a minimum acceptable difference, but no maximum.

The functional group to be used for the soft, flexible binder component is related to the group preferably found in the star. The group is preferably the same. This does not necessarily means that a third component needs to be added as a crosslinker since for example with the epoxide functional group, co- and homopolymerization of the epoxides can lead to a crosslinked film.

The four most usual backbone types used for the soft matrix or film-forming (B) phase are polyester, polyether, acrylic and epoxy acrylic. Polyester backbones of low glass transition temperature are described in U.S. Pat. No. 4,076,766. Alternatively, hydroxyacids or their corresponding lactones also can be used in the preparation of the polyester polyol. Other backbone types that can be used for the soft (B) phase include hydrocarbon resins with functionality such as diols, polyurethanes, polycaprolactones, polycarbonates and polysiloxanes. Often the (B) polymers are condensation polymers.

Acrylic polymers which have low glass transition will most likely be based on copolymers of butyl acrylate, ethyl acrylate, acrylonitrile, or butyl methacrylate with the functional monomer of choice, for example, 2-hydroxyethyl methacrylate, trimethoxysilylpropyl methacrylate, glycidyl methacrylate, acrylic acid, or isocyanatoethyl methacrylate, for example.

Polyetherpolyols include those based on propylene oxide or tetrahydrofuran, which for example produces tetramethyleneether diol.

To be a useful soft phase, the average functionality of the polyol should be at least 2, and the equivalent weight will probably be no higher than 2000. Preferably for some purposes, a hydroxyl number of at least 50 is used.

Preferably, the amount of the soft component plus any crosslinkers exceeds the amount of the star. While a combination with star polymer in excess of this total can be useful, it may not have an optimum balance of flexibility and hardness.

Blends of different soft polymers carrying the same functional group would be useful, for example a blend of an acrylic polyol with a polyester polyol.

A challenge with the soft phase is control of film clarity when that is desirable. This is usually achieved by keeping the number average molecular weight of the soft phase former below about 3000. Thus, the degree of haze or loss of transparency resulting from using a multi-phase blend rather than a solid solution alloy of polymers can be controlled when it is important, as in clear finishes for use as automotive paint topcoats.

In the preferred preparation of the star polymers, use is made of group transfer polymerization. Thus, polymerization of the monomer,

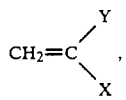

initiated by a group transfer initiator, Q–Z, proceeds as follows:

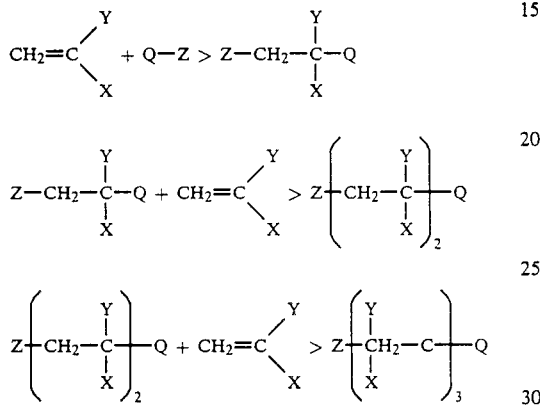

The group, Q, is thus an active site that can initiate further polymerization of more monomer. The polymer molecule having the group, Q, is referred to as a "living" polymer and the group, Q, is referred to as a "living" group transfer polymerization site.

The word "living" is used herein in quotation marks to indicate its special meaning and to distinguish it from substances which are alive in a biological sense.

More particularly, in the preparation of the star polymers, use is made of the "group transfer" polymerization process of the general type described in part by W. B. Farnham and D. Y. Sogah, U.S. Pat. No. 4,414,372 and by O. W. Webster, U.S. Pat. No. 4,417,034, and in continuation-in-part U.S. Pat. No. 4,508,880 Webster, granted April 2, 1985, and U.S. Pat. No. 4,524,196 Farnham and Sogah, granted June 18, 1985, and U.S. Pat. No. 4,588,795 Dicker et al. (1986), the disclosures of all of which are incorporated herein by reference. Group transfer polymerization produces a "living polymer" when an initiator of the formula $(R^1)_3MZ$ is used to initiate polymerization of a monomer having a carbon-carbon double bond.

In the initiator, $(R^1)_3MZ$, the Z group is an activating substituent that becomes attached to one end of the "living" polymer molecule. The $(R^1)_3M$ group becomes attached to the other ("living") end of the "living" polymer molecule. The resulting "living" polymer molecule can then itself act as an initiator for polymerization of the same or a different monomer to produce a new "living" polymer molecule having the Z activating substituent at one end and the $(R^1)_3M$ group at the other ("living") end. The "living" polymer may then be deactivated, if desired, by contacting it with an active proton source such as an alcohol. At this point, it might be useful to consider a specific example—the group transfer polymerization of a specific monomer (in this case, methyl methacrylate) using a specific group transfer initiator (in this case 1-trimethylsiloxy-1-isobutoxy-2-methylpropene). The reaction of 1 mole of initiator with n moles of monomer produces "living" polymer as follows:

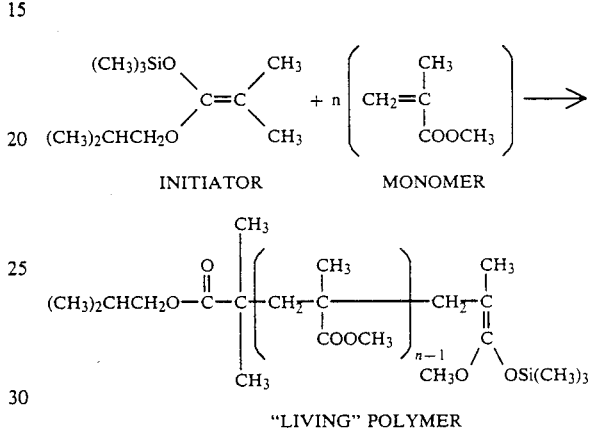

"LIVING" POLYMER

The 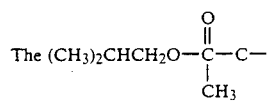

group shown on the left side of the "living" polymer molecule is derived from the activating group, Z, which, in the initiator, was in the form

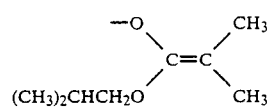

The $-Si(CH_3)_3$ group on the right side ("living" end) of the "living" polymer molecule is the $(R^1)_3M$ group. The "living" polymer molecule can act as an initiator to initiate polymerization of the same or a different monomer. Thus, if the above "living" polymer is contacted with m moles of butyl methacrylate, the following "living" polymer is obtained:

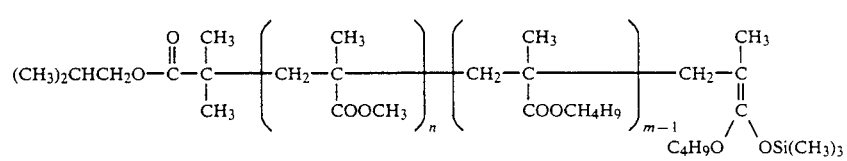

If the resulting "living" polymer is then contacted with methanol, the following deactivated polymer is obtained.

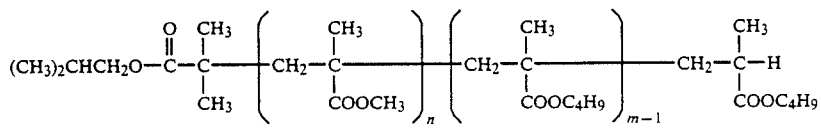

The star polymers of the invention are prepared by three different methods, each making use of the group transfer process described above.

Preferably, the star polymers of the invention are prepared by an arm-first method. In this method, a "living" polymer (the arm) is prepared by contacting a monomer (A) having a carbon-carbon double bond with a group transfer initiator, $(R^1)_3MZ$. The resulting "living" polymer is then contacted with a multifunctional linking agent (monomer B) having at least two polymerizable double bonds per molecule of linking agent. This produces a star polymer having arms of polymerized monomer A attached to a crosslinked core of polymerized monomer B. The active group transfer sites in the core can be deactivated by reaction with a proton source.

The multifunctional linking agent referred to above can be any molecule having at least two polymerizable carbon-carbon double bonds. Examples of suitable linking agents are:
ethylene glycol dimethacrylate
1,3-butylene glycol dimethacrylate
tetraethylene ether glycol dimethacrylate
triethylene ethyl glycol dimethacrylate
trimethylolpropane trimethacrylate
1,6-hexane diol dimethacrylate
1,4-butane diol dimethacrylate
ethylene glycol diacrylate
1,3-butane diol diacrylate
tetraethylene ether glycol diacrylate
triethylene ether glycol diacrylate
trimethylolpropane triacrylate
1,6-hexane diol diacrylate
1,4-butane diol diacrylate
Other useful ingredients and techniques will be found in the herein incorporated above-mentioned U.S. Patents, especially U.S. Pat. No. 4,417,034—Webster, in columns 2-9 and U.S. Pat. No. 4,588,795 Dicker et al.

Suitable crosslinking polymers are discussed in U.S. Pat. No. 4,076,766.

The acrylic star polymer is greater than 75% arm, frequently with no more 10% core material based on method of synthesis. The core is formed from dimethacrylate monomer, and the core content is considered to be the proportion of dimethacrylate monomer in the charge. The substituents will always be on the arms. Hydroxyl is the preferred functional group, although star preparation requires that the hydroxyl be blocked during preparation. 2(-Trimethylsiloxy)ethyl methacrylate is a monomer of choice for introducing blocked hydroxyl. It is coreactive with melamine resin, for example, in a blend also containing polyesterdiol, but in most instances has been hydrolyzed to form the hydroxyl bearing star. A preferred reinforcing star is all methacrylate, both core and arm. The functional group is preferably at a level providing at least about 1 group per arm on the average.

Arm molecular weight preferably should not exceed the entanglement molecular weight for the corresponding linear polymer. For poly(methyl methacrylate) this is about a number average molecular weight of 20,000. Since stars are most useful with arms of 5000 to 15,000, preferably with an arm molecular weight within the limits of 3000 to 20,000. The core content can be 3 to about 25% or higher, with a preferred content of 5 to 20%. For some purposes, terminal hydroxyl groups may be preferred, and random hydroxyl groups for other purposes. A useful range of hydroxyl content is hydroxyl numbers from 8 to 120, with a preferred range for economy of functional group content from 8 to 40. Other functional groups can be used in the same proportions.

The star is a reinforcing agent and as such becomes active at modest concentrations, for example about 10% of the coating weight, but should not be used at such a high level that the soft phase becomes less than about 15% of the composition. Since it is preferred to have a crosslinking agent, such as at the level of at least 25% of the total, 60% has been selected as the maximum content for the star polymer.

INTRODUCTION TO EXAMPLES

The examples will show a group of arm first stars including a functional group free control. The first examples will have arms of MMA/EEM, and its hydrolysis product, MMA/HEMA. A table is provided to identify which compositions were used in the coating examples. Table 1 includes examples of star polymers made with just two monomers in the arm, MMA/EEM, EMA/EEM, and nBMA/EEM as well as the copolymer arms MMA/EMA/EEM, and MMA/BMA/EEM.

Two molecular weights will be included where possible. Examples showing hydrolysis are inserted after each of the star preparations. The final preparative example will be of the nonfunctional MMA star.

The examples will first cover isocyanate curing, and then will give the melamine curing agent data. Although Ruccoflex 1015-100 is used almost exclusively as the polyol component there is one example with a branched polyesterurethane polyol. Materials Used:
A. Initiators
  Isobutyl Initiator
    1-trimethylsiloxy-1-isobutoxy-2-methylpropene

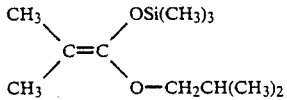

Molecular Weight: 216.39
"Methyl Initiator"
  Name: 1-trimethylsiloxy-1-methoxy-2 methylpropene

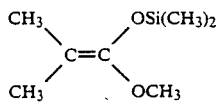

Molecular Weight: 174.32
B. Catalysts
 "TBAMCB"
  Name: Tetrabutylammonium m-chlorobenzoate

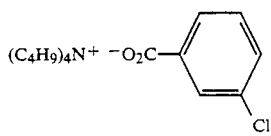

C. Solvents
 Glyme
  1,2-dimethoxyethane $CH_3OCH_2CH_2OCH_3$
 Others
  Acetonitrile = $CH_3CN$
  Xylene

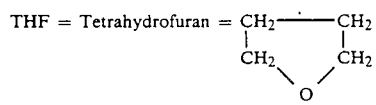

D. Monomers
 MMA = methyl methacrylate
  M.W. = 100.12
 EMA = ethyl methacrylate
  M.W. = 114.14
 n-BMA = n-butyl methacrylate
  M.W. = 142.1
 EEM = 2-(1-ethoxyethyoxy)ethyl methacrylate

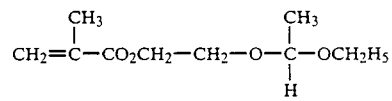

M.W. = 202.25
DDM = (2,2-dimethyl-1,3-dioxolan-4-yl)methyl methacrylate

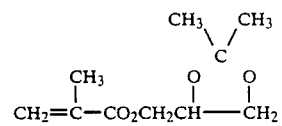

M.W. = 200.24
EGDMA = ethylene glycol dimethacrylate Blocked hydroxyl monomers for star preparation and use as such or after hydrolysis:
 2-(trimethylsiloxy)ethyl methacrylate
 2-(ethoxyethoxy)ethyl methacrylate
 2-(butoxyethoxy)ethyl methacrylate
Alkoxysilyl functionality:
 3-(trimethoxysilyl)propyl methacrylate
Epoxide functionality:
 2,3-epoxypropyl methacrylate
Amine functionality:
 Reaction of 2,3-epoxypropyl methacrylate containing star with methyl amine or ammonia.

There are several approaches to the introduction of hydroxyl groups into the methacrylate star polymer, including the use of Acetal or ketal blocked hydroxyl groups in methacrylate monomers. This was the approach used in much of this work, and the material used was 2-(1-ethoxyethoxyl)ethyl methacrylate, EEM. The preparation EEM is described in Preparation 1 which is a refinement of Example 1 in U.S. Pat. No. 3,530,167.

Particular ketal monomers which might be used include (2,2-dimethyl-1,3-dioxolan-4-yl)methyl methacrylate, DDM. DDM was synthesized as is described in Preparation 2. It provides an alternative to using acetal type comonomers.

Trimethylsiloxy blocked hydroxyethyl methacrylate would provide a suitable comonomer for introduction of the reactive site in these materials.

A branched chain polyesterurethane has also been used, and its synthesis is given in Preparation 3.

Two mixed methyl butyl melamine resins have been used for crosslinking. One of these, Resimene 0316 from Monsanto Co., is somewhat more polymeric than the other, Resimene 755. While I prefer to use Resimene 755 to obtain the highest solids, many of the nitrogen resins commonly used in coatings would probably be satisfactory. There is some indication that clearer films are obtained with the monomerics.

Desmodur 3390, an isocyanurate oligomer from Mobay Chemical Co. made from hexamethylene diisocyanate is the isocyanate functional crosslinking agent generally used. The older materials such as Desmodur N should be equally satisfactory, as should other oligomerics such as those based on isophorone diisocyanate or the 2,4-toluene diisocyanate adduct of trimethylol propane. The oligomerics are preferred for their low volatility. The amount of isocyanate used generally provided 80 to 120% of the calculated NCO content relative to the hydroxyl content of the film former.

Films have been made with 15 to 60% star polymer content. Film hardness is not linearly related to star content, tending to rise rapidly at low concentrations. I have made films using only star polymer and crosslinker, and find them to be hard, clear and inflexible.

The stars in the examples have all been prepared by the arm first process, and the hydroxyl groups generally have been randomly dispersed, although hydroxyl groups at the ends of the arms can be used. Four levels of hydroxyl group have been prepared, 8, 13, 22 and 44 hydroxyl number. Although most of the stars have been between 1:3 and 1:4 mole ratios of arm to dimethacrylate core former, ratios of 1:1 to 1:10 can be used. The arm molecular weights have ranged from 5000 to about 15,000. The monomers used have been MMA, EMA, and n-butyl methacrylate. The harder stars give the best results with isocyanate crosslinkers, while the melamine resin crosslinkers give more transparent films with softer stars made with MMA/EMA/HEMA or MMA/nBMA/HEMA copolymer arms or with stars containing only EMA and the crosslinking site in the arm.

A compromise composition which might be useful with both crosslinking systems is the MMA/EMA-/EEM(45/45/10) arm star.

PREPARATION 1

2-(Ethoxyethoxy)Ethyl Methacrylate (EEM)

The following procedure has been reproduced yielding product greater than 98% pure in about 65% distilled yield. Analysis by high pressure liquid chromatography (HPLC) using a UV detector was used. The only impurity identified was 2-hydroxyethyl methacrylate. This active hydrogen source must be kept below 2% in the product for the intended use. Usually the product is greater than 99% pure by this method.

Equipment:

A 1000 ml 4 neck flask fitted with a stainless steel stirrer, thermocouple for pot temperature, additional funnel and reflux condenser was used. Reaction temperature was controlled with an ice/water bath on a lab-jack.

The distillation was done using a vacuum jacketed column with an integral distillation head. Full vacuum was used which gave a pressure at the trap of 0.3 mm. The product from each run was split and distilled in two batches from a 300 ml round bottom flask. The distillation was done at a 1/1 ratio taking about 23% of each charge as a forcut to carry out residual hydroxyethyl methacrylate. About 8% of the charge was left in the pot when the distillation was terminated. The pot temperature varied between 52° and 60° C. while the head temperature was 37°-39° C. during take off of the main fraction which was usually greater than 99% EEM.

Procedure:

Charge the flask with ethyl vinyl ether (151.4 g, 2.1 Mole). Add a mixture of 2-hydroxyethyl methacrylate (260.4 g, 2.0 Mole), concentrated hydrochloric acid (0.5 ml) and hydroquinone (1.0 g) dropwise over 20 minutes with stirring. Use the ice/water bath to keep the temperature between 25°-30° C. during the addition and during the following 4 hours. The exotherm is almost totally over after the 20 minute addition. The addition period should not be reduced because the exotherm will be substantially more difficult to control.

After the 4 hour hold, sodium bicarbonate (6.0 g) was added and the mixtured stirred for 3 hours. The solids were then removed by filtration through a medium fritted-disk funnel. Phenothiazine (2 g) was added prior to the division and distillation to obtain EEM as described above in the Equipment section. The product is inhibited with 20 ppm of the monomethyl ether of hydroquinone and stored under nitrogen in dry glass bottles.

PREPARATION 2

(2,2-Dimethyl-1,3-Dioxolan-4-yl) Methyl Methacrylate (DDM) via Acid Catalyzed Ketalization of Glycidyl Methacrylate A 1000 mL singleneck roundbottom flask was equipped with a magnetic stir bar and a reflux condenser than charged with glycidyl methacrylate (GMA, 142.0 g, 1.0 M), acetone (580.0 g, 10.0 M) and trifluoromethane sulfonic acid (TFMA, 0.24 g, 1.6 MMoles). The mixture was heated to reflux and maintained there for 3 hours. After cooling, the mixture was neutralized with an aqueous sodium carbonate solution then concentrated on a rotary evaporator to yield a pale yellow liquid (193.7 g). Vacuum distillation (0.1 g phenothiazine added to pot) afforded a colorless liquid (157.9 g, 0.79 M). B.P. 60°-62° C. (at 0.3 mm Hg).

PREPARATION 3

BRANCHED CHAIN POLYESTERURETHANE

This preparation was done on a 12 liter scale using a packed vacuum jacketed column topped with a water separator to remove the water of esterification and return neopentyl glycol to the flask.

Charge:
Part I:
  Azelaic acid, 1890.5 g (10.056 moles)
  Dodecanedioic acid, 2312.9 g (10.056 moles)
  Neopentyl glycol, 2332.2 g (22.425 moles)
  Trimethylol propane, 337.4 g (2.514 moles)
  Toluene, 247.1 g
Part II:
  Stannous octoate, 0.47 g
  Toluene, 65.0 g
Part III:
  Stannous octoate, 0.637 g
  Toluene, 65.0 g
  (Theoretical water of esterification = 724 g)
Part IV:
  Toluene, 2381 g
Part V:
  Neopentyl glycol, 509.9 g (4.903 moles)
Part VI:
  Trimethyl hexamethylenediisocyanate, 1384 g (6.59 mole)

Procedure:

Charge Part I to the flask, blanket with nitrogen, heat to melt, start the stirrer. Hold the batch at reflux as the temperature rises from 140° C. to 200° C. over 7.5 hours. At this point, 616.5 g, 85% of the theoretical water had been removed. Part II was then added and heating continued for 3.5 more hours to a pot temperature of 196° C. Part III was then added and the reaction continued for a total of 21.8 hours to acid number of 0.11. A total of 716.2 g of water, 98.9% of the theoretical water of esterification was recovered. Analysis showed the water contained 0.01% NPG, which is less than 0.01% of the NPG charged.

Part IV was then added to reduce the temperature. Part V was then added. The mixture was refluxed for 10 minutes to dry the system again and remove any water that was introduced with the NPG. Part VI was then added over 30 minutes at a batch temperature of 120°-125° C. and held for an additional 30 minutes at 120° to 125° C..

The clear very light yellow product had the following characteristics:
  % Solids = 75.48
  GH viscosity = z-¼ (21.4 Stokes)
  OH # = 60 (solids basis)
  Acid #0.075 (solution basis)
  Brookfield Viscosity 2668 cp. (#2 spindle, 10 rpm)
  $M_n$ = 3259 (number average molecular weight)
  $M_w$ = 14290 (weight average molecular weight)
  d = 4.42 (polydispersity = $M_w/M_n$)
  Gardner color = 4

EXAMPLE 1

This describes the preparation of a star polymer with MMA/EEM (90/10 by weight) arms by making the arm polymer first and then connecting the arms together. This polymer can be hydrolyzed to a hydroxyl functional star for use in reinforcing isocyanate or melamine resin crosslinked films.

The polymer and especially its hydrolysis product are useful as a rheology control agent in high solids paints of both the unicoat and color coat/clear coat types.

A three-neck round bottom flask fitted with a mechanical stirrer, a reflux condenser, a rubber septum, a temperature probe and provision for maintaining a dry argon atmosphere was used as a reaction vessel. After baking the equipment overnight in a 100° C. oven, it was cooled and purged with argon. The flask was then charged with the following initial charge:

| Initial Charge: |  |
| --- | --- |
| 468.0 g | glyme |
| 2.0 g | p-xylene |
| 8.9 g | 1-trimethylsiloxy-1-methoxy-2-methylpropene |

To the initial charge was then added via a syringe pump:
100 microliters of 1 molar tetrabutylammonium m-chlorobenzoate in acetonitrile mixed with 2.0 cc of glyme The mixture thus obtained was stirred for 15 minutes under dry argon. The remaining catalyst solution and the monomers were then added via syringe pumps according to the following schedule. At the beginning of the first feed, a clock was started and left running to keep track of the feeds and other steps.

The feed compositions and the clock times (in minutes at which the additions of the feed compositions were started and completed were as follows:

| Feed Composition | Clock Time Minutes | |
| --- | --- | --- |
|  | Started | Completed |
| I 300 microliters of 1.0 M TBAMCB in 6.0 cc of glyme | 0 | 120 |
| II 185 g MMA 20 g EEM | 0 | 45 |
| III 20 g EGDMA | 65 | 75 |

During the additions of the feeds, the temperature gradually increased, reaching a maximum of 56.2 C at a clock time of 46 minutes. At a clock time of 130 minutes 5 g of methanol was added to quench the reaction. The resulting clear solution of star polymer has a solids content of 33.82% (vs 33.68% theoretical), indicating that complete conversion of the monomers had occurred. The solution had a viscosity of 133 cpoise measured using a Brookfield viscometer (#2 spindle, 100 rpm).

The molecular weight of the product star polymer, measured by size exclusion chromatography in tetrahydrofuran solution was bimodal with a number average molecular weight (Mn) of 4320, d=1.14 constituting 23% of the product, and a second peak with a Mn of 84100, d=1.26. The lower molecular weight material is believed to be typical of the arm molecular weight of this star, and results from termination of polymerization by impurities in the polymerization, principally water, or other processes. The higher molecular weight material is the desired star polymer. Since the calibration is relative to linear polymethyl methacrylate, the actual molecular weight of the star is probably substantially higher.

This describes the hydrolysis of the acetal functional star prepared in example 1 to form a hydroxyl functional polymer.

A three-neck round bottom flask fitted with a mechanical stirrer, a distillation head, a temperature probe and a resistance heating mantle was used as the reaction vessel. Charge:
295.7 g Product of example 1 containing 100 g of solids
50 g isopropyl alcohol
100 g toluene
4.5 g water (5 X the stoiometric amount for hydrolysis)
0.1 g dodecylbenzenesulfonic acid in 0.9 g of isopropyl alcohol The mixture was heated at reflux for 2 hours (82° C.). Distillate was then removed to total 200.7 g over 5 hours to a reactor temperature of 94.5° C. The resulting clear solution had a solids content of 42.3% and a viscosity of 812 centipoise. Its hydroxyl number was 21.4 (solids basis, theory=22.4) indicating that essentially complete conversion of the blocking acetal groups to hydroxyl groups had occurred.

Molecular weight measurements by size exclusion chromatography indicated that the Mn of the lower molecular weight peak was 4360, d=1.11, the higher molecular weight peak (the star) Mn=81,900, d=1.28. The measurements were again made in tetrahydrofuran and calibrated against polymethyl methacrylate. The small mass loss in the hydrolysis may be reflected in the 2200 mass units difference between the star Mn before and after hydrolysis.

EXAMPLES 3 TO 12

These are given in table 1 as pairs of preparations, first the preparation of the star including the blocked hydroxyl comonomer, and then the product of hydrolysis from this star. Examples 1 to 12 all used EGDM as the dimethacrylate, at a molar ratio of dimethacrylate to initiation of 4 to 1.

Comparison 1

In this comparison the MMA arm star containing no additional function groups is shown to give very poor film flexibility in a blend with polyesterdiol and oligomeric isocyanate curing agent. All weights are for the proportions on nonvolatiles combined.

6.9 g MMA arm star
5.00 g NPG/6G/6 polyesterdiol "Ruccoflex" 1015-100 linear polyester diol from Rucco Polymer Corp. of Hicksville, N.Y.

This diol is neopentyl glycol/1,6-hexanediol/adipate with an OH # of 100. 1.98 g "Desmodur" 3390 isocyanate crosslinking agent 0.006 g Dibutyltin dilaurate catalyst. This mixture was knife coated from a 40% solids solution onto 24 gauge steel, glass and thermoplastic urethane "Pelethane" 2354 from Polymer Chemicals Div. of the Upjohn Co. of La Porte, Tex. flashed 15 minutes and baked 30 minutes at 121° C. The film was uniformly hazy in appearance, with the following properties:
4.2 Knoop hardness number (KMN) on glass
5 in lb (5.8 cm kg) direct and reverse impact resistance on steel
Failed 5 cm bend test at room temperature on thermoplastic polyurethane.

These results indicate that the unmodified star is nonreinforcing in this soft polyesterurethane matrix.

EXAMPLE 13

This example shows the result of having hydroxyl groups in a star which is cured with oligomeric isocyanate curing agent. All weights are for the proportions of nonvolatiles combined. The ratio of NCO to OH in the composition is 0.85/1 6.95 g MMA/HEMA Star of example 1

| | |
| --- | --- |
| 1.98 g | Hexamethylene diisocyanate isocyanurate |

| | |
|---|---|
| 5.0 g | oligomer, "Desmodur" 3390, 5.13 milliequivalents of OH per gram of solids NPG/6G/6 polyesterdiol of 1100 M.W., "Ruccoflex" 1015-100 |
| 0.003 g | Dibutyltin dilaurate |

This mixture was knife coated from a 40% solids solution onto 24 gauge steel, glass, and thermoplastic urethane "pelethane" 2354, flashed 15 minutes and baked 30 minutes at 121° C. The resulting films were 2.2 mils thick, and were very slightly hazy.

The film had the following properties over the indicated substrate:
4.4 KHN hardness on glass
160 in lb (185 cm kg) reverse and direct impact resistance on 24 gauge zinc phosphated autobody steel
No cracks at −29° C. when tested by bending the coated "pelethane" 2354 with the coating outward over a 1.25 cm diameter rod. The coated panel had been conditioned 2 hours at −29° C. before this test.

Moderate softening after exposure to xylene for 1 hour. The xylene is kept from evaporating during this time by covering it with a cover glass.

This performance indicates this composition is satisfactory for a universal type coating for metals and plastics since it is hard enough to resist marring on metal and flexible enough to avoid cracking on flexible plastic.

Comparison 2

This comparison shows that the hydroxyl free star polymer is not useful in reinforcing soft, moderately flexible binders. It acts as a filler in that the film is made hard, but brittle.

| | |
|---|---|
| 6.95 g | MMA/EEM Star |
| 1.98 g | Hexamethylene diisocyanate oligomer "Desmodur" 3390 |
| 5.00 g | NPG/6G/6 polyesterdiol, Ruccoflex 1015-100 |
| 0.003 g | Dibutyltin dilaurate |

The coatings were prepared and tested as shown in example 14, with the following results:
4.3 KHN on glass
5 in lb (5.8 cm kg) impact resistance, front and reverse on 24 gauge autobody steel
Fails bend over a 5 cm diameter pipe at 23° C.
Poor xylene resistance This composition does not have the properties required for a broadly useful coating, and its poor flexibility indicates the star polymer is not acting as a reinforcing agent.

EXAMPLES 14 TO 20

These examples are given in table 2. They show other isocyanate crosslinked coatings containing star polymers. In these examples, all the star polymers contain hydroxyl groups at the 22 hydroxyl number level. Examples 14, 15, 16 and 19 show that stars containing ethyl methacrylate and methyl methacrylate are required at the 50% star content to give a film harder than 1 KHN.

The star containing only butyl methacrylate and HEMA in the arm, example 16, has marginal hardness for use as a reinforcing agent.

Examples 17, 18, and 19 show that the stars themselves do not produce films with exceptional flexibility, having properties that are good for metal coatings, but not for flexible plastic.

TABLE 1

ACETAL AND HYDROXYL EXAMPLES

| EX. NO. | MONOMER 1 % | MONOMER 2 % | ARM Mn CALCULATED | ARM Mn | ACTUAL Mw |
|---|---|---|---|---|---|
| 1 | 90.0 MMA | 10.0 EEM | 5000 | 4320 | 4940 |
| 2 | 93.3 MMA | 6.7 HEMA | 4835 | 4360 | 4820 |
| 3 | 90.0 EMA | 10.0 EEM | 10000 | 9690 | 12300 |
| 4 | 93.3 EMA | 6.7 HEMA | 9670 | 8860 | 12000 |
| 5 | 90.0 BMA | 10.0 EEM | 10000 | 9620 | 12300 |
| 6 | 93.3 BMA | 6.7 HEMA | 9670 | 9660 | 12300 |
| 7 | 90.0 MMA | 10.0 EEM | 10000 | 9840 | 12600 |
| 8 | 93.3 MMA | 6.7 HEMA | 9670 | 9000 | 11600 |
| 9 | 45/45 MMA/EMA | 10.0 EEM | 10000 | 11700 | 13300 |
| 10 | 46.65/46.65 MMA/EMA | 6.7 HEMA | 9670 | 12300 | 13400 |
| 11 | 71.1/18.9 MMA/BMA | 10.0 EEM | 10000 | 10200 | 12700 |
| 12 | 73.7/19.6 MMA/BMA | 6.7 HEMA | 9670 | 10600 | 13100 |

| EX. NO. | STAR Mn | ACTUAL Mw | STAR POLY-DISPERSITY | FREE ARM ARMS % | SOLIDS % | VISCOSITY CENTIPOISES |
|---|---|---|---|---|---|---|
| 1 | 84100 | 106000 | 1.26 | 22 | 33.80 | 132 |
| 2 | 81900 | 105000 | 1.28 | 22 | 42.30 | 812 |
| 3 | 118000 | 146000 | 1.24 | 22 | 40.60 | 270 |
| 4 | 117000 | 147000 | 1.26 | 22 | 39.40 | 318 |
| 5 | 121000 | 151000 | 1.24 | 20 | 40.60 | 126 |
| 6 | 115000 | 146000 | 1.26 | 20 | 40.00 | 154 |
| 7 | 165000 | 204000 | 1.24 | 33 | 42.50 | 1412 |
| 8 | 162000 | 200000 | 1.24 | 33 | 40.00 | 1138 |
| 9 | 103000 | 136000 | 1.31 | 18 | 40.20 | 406 |
| 10 | 103000 | 133000 | 1.29 | 18 | 39.50 | 469 |
| 11 | 144000 | 185000 | 1.28 | 18 | 39.50 | 339 |
| 12 | 154000 | 199000 | 1.28 | 18 | 39.50 | 426 |

TABLE 2

FLEXIBLE URETHANE CROSSLINKED FINISHES MODIFIED WITH STAR POLYMERS

| EX. # | STAR OF EX # | STAR (WT) | POLYOL | POLYOL (WT) | POLY ISO-CYANATE DES N3390 (WT) | KHN | CLARITY OF FILM |
|---|---|---|---|---|---|---|---|
| 14 | 8 | 10 | R* | 6.8 | 3.200 | 5.4 | V SL HAZE |
| 15 | 4 | 10 | R* | 6.8 | 3.200 | 1.2 | CLEAR |
| 16 | 6 | 10 | R* | 6.8 | 3.200 | 0.9 | V SL HAZE |
| 17 | 8 | 10 | NONE |  | 0.779 | 15.8 | CLEAR |
| 18 | 4 | 10 | NONE | NONE | 0.779 | 12.0 | CLEAR |
| 19 | 6 | 10 | NONE | NONE | 0.779 | 6.4 | CLEAR |
| 20 | 10 | 10 | R* | 6.8 | 3.240 | 3.1 | CLEAR |

| EX. # | FLEXIBILITY OF FILM | SOLVENT RESISTANCE | IMPACT (in lb) = (cm kg) × 1.15 | REVERSE IMPACT (in lb) | MISC. |
|---|---|---|---|---|---|
| 14 | PASS 1.25 CM BEND @ −29° C. | MODERATE TO XYLENE | >160 | >160 |  |
| 15 | PASS 1.25 CM BEND @ −29° C. | FAIR TO XYLENE | >160 | >160 |  |
| 16 | PASS 1.25 CM BEND @ −29° C. | FAIR | >160 | >160 |  |
| 17 | FAIL 5 CM BEND @ 23° C. | EXCELLENT | 20 | <5 | MMA/HEMA/STAR |
| 18 | FAIL 5 CM BEND @ 23° C. | EXCELLENT | 20 | <5 | EMA/HEMA/STAR |
| 19 | PASS 1.25 CM BEND @ 23° C. | FAIR | 30 | <5 |  |
| 20 | PASS 1.25 CM BEND @ −29° C. | FAIR | >160 | >160 | MMA/EMA/HEMA/STAR |

*R = Ruccoflex 1015-100

EXAMPLE 21

In this example a monomeric melamine resin will be used as the crosslinking agent to produce a film with exceptional hardness and flexibility. In this example 40% star polymer is used in the coating. The star has arms containing 73.7% MMA, 19.6% BMA, and 6.7% HEMA.

13.36 g MMA/nBMA/HEMA star
12.00 g polyester diol, "Ruccoflex" 1015-100
8.00 g methyl/butyl melamine resin Resimene 755
0.20 g Dodecylbenzene sulfonic acid This polymer was cast from 55% solution using a 175 mm gap coating knife to produce coatings with 2.3 mils dry film thickness on glass, autobody steel, and thermoplastic polyurethane rubber. The coated samples had the following properties:

5.4 KHN hardness on glass passed 1.25 cm bend at −29° C. on urethane rubber 160 in lb (185 cm kg) reverse and direct impact resistance on autobody steel. Very good resistance to xylene.

These properties make this composition suitable for use as a universal clear coat for automotive clear coat/color coat exterior finishing systems.

This type composition was also prepared using 33, 25 and 15% star with essentially the same flexibility and solvent resistance results. The KHN's were 3.5 for 33% star, 2.9 for 25% star and 1.7 for 15% star indicating that compositions with as little as 15% star are of interest as coatings of broad utility. The unmodified polyester/urethane is too soft to measure using the Tukon hardness tester used to determine Knoop Hardness Numbers (KHN).

EXAMPLES 22–25

These examples are given in Table 3. They show that other star polymers and melamine resins can be used to reinforce soft films to give hard, flexible finishes. All used "Ruccoflex" 1015-100 as the polyol and "Resimene" 0316 as the melamine. It is particularly important to note that the base soft flexible film is actually not as impact resistant as the star modified coatings.

TABLE 3

FLEXIBLE MELAMINE CROSSLINKED FINISHES MODIFIED WITH STAR POLYMERS

| EX. NO. | STAR OF EX. # | STAR | WT. POLOYL | WT. MELAMINE | KHN | CLARITY OF FILM |
|---|---|---|---|---|---|---|
| 22 | NONE | NONE | 12.00 | 8.0 | TOO SOFT TO MEASURE | CLEAR |

TABLE 3-continued

FLEXIBLE MELAMINE CROSSLINKED
FINISHES MODIFIED WITH STAR POLYMERS

| EX. NO. | | | | | | |
|---|---|---|---|---|---|---|
| 23 | 10 | 10.0 | 6.00 | 4.0 | 5.4 | CLEAR |
| 24 | 10 | 6.6 | 7.94 | 5.3 | 2.9 | V SLIGHT HAZE |
| 25 | 10 | 10.0 | 6.00 | 4.0 | 3.5 | CLEAR |

| EX. NO. | FLEXI- BILITY OF FILM | SOLVENT RESIS- TANCE | IMPACT DIRECT in lb = cm kg × 1.15 | REVERSE IMPACT (in lb) | MISC. |
|---|---|---|---|---|---|
| 22 | PASS 1.25 CM BEND @ −29° C. | EXCELLENT | 100 | 120 | |
| 23 | PASS 1.25 CM BEND @ −29° C. | GOOD | >160 | >160 | MMA/EMA/ HEMA ARM STAR |
| 24 | PASS 1.25 CM BEND @ −29° C. | FAIR | >160 | >160 | 33% STAR IN COATING |
| 25 | PASS 1.25 CM BEND @ −29° C. | GOOD | >160 | >160 | EMA/HEMA ARM STAR AT 50% |

EXAMPLE 26

In this example a branched chain polyesterurethane is combined with a star polymer and crosslinked to yield a film with a useful hardness/flexibility balance.

10 g EMA/MEMA arm star
12 g NPG/TMP/12 polyester extended with TMHDI
8 g "Resimene" 755 melamine resin
0.2 g Dodecylbenzene sulfonic acid Coatings cast and evaluated as previously described had the following characteristics:

5.1 KHN on glass
160 in lb (185 cm kg) direct impact resistance on autobody steel
130 in lb (150 cm kg) reverse impact resistance on autobody steel
Passes ½ in bend test on thermoplastic urethane at −29° C. by showing no cracks or flaws.

In this example the tests were on films that were 2.5 mils thick. The coatings were slightly hazy at this thickness. As indicated in Preparation 3, the hydroxyl number of the extended polyester is about 60 and its Mn is about 3000.

EXAMPLE 27

Star Polymer Containing 2-(Trimethylsiloxy)Ethyl Methacrylate

A three-neck round bottom flask fitted with a mechanical stirrer, a reflux condenser, a rubber septum, a temperature probe and provision for maintaining a dry nitrogen atmosphere was used as the reaction vessel. After baking the equipment overnight in a 100° C. oven, it was cooled and purged with dry nitrogen. The flask was then charged with the following initial charge:

Initial charge:
290 g of tetrahydrofuran
267 g of toluene
12.2 g of 1-trimethylsiloxy-1-methoxy-2-methylpropene To the initial charge was then added via a syringe pump;
4.5 cc of a solution of 1.0 cc of 1 molar solution of tetrabutylammonium m-chlorobenzoate in acetonitrile mixed with 20 g of toluene.

The mixture thus obtained was stirred for 15 minutes under dry nitrogen. The remaining catalyst solution and the monomers were then added via syringe pumps or dropping funnels as appropriate according to the following schedule. At the beginning of the first feed, a clock was started and left running to keep track of the feeds and other steps.

The feed compositions and the clock times (in minutes at which the additions of the feed compositions were started and completed were as follows:

| Feed | Composition | Clock Time Minutes Started | Completed |
|---|---|---|---|
| I | Balance of tetrabutyl-ammonium-m-chlorobenzoate solution described above | 0 | 120 |
| II | 306.8 g methyl methacrylate* 36.1 g 2-(trimethylsiloxy)ethyl methacrylate** | 0 | 30 |
| III*** | 41.6 g ethyleneglycol dimethacrylate* | 100 | 110 |
| IV**** | 10 g methanol | | |

Notes:
*Dried to less than 10 ppm water using a column packed with 80–200 mesh neutral alumina, Brockman activity 1, 80–200 mesh from Fisher Scientific Co.
**From Petrarch Systems, 2731 Bartran Road, Bristol, Pennsylvania.
***Before this addition, complete conversion of the arm forming monomer was determined using a high pressure liquid chromatograph.
****Terminates the still living silyl enol ether polymerization sites.

During the first 16 minutes of clock time the temperature rose to 35° C. at which time external cooling was used to keep the temperature between 27° and 36° C. for the balance of the reaction.

The resulting star polymer solution had a viscosity of 635 centipoise when measured using a Brookfield rotating viscometer, #3 spindle, at 100 rpm. The nonvolatile content of the solution was 39.6% confirming the chromatographic determination which had indicated that complete conversion of methacrylate monomers had been achieved. The arms of the star polymers have random hydroxyl groups.

The star polymer was characterized using size exclusion chromatography to give the following molecular weights, including the Z average molecular weight, Mz.

|  | Measurement | | | |
| --- | --- | --- | --- | --- |
|  | Mn | Mw | Mz | d |
| Arm (prior to attachment to core to form stars) | 7,040 | 8,350 | 9,780 | 1.18 |
| Star | 71,200 | 89,400 | 118,000 | 1.25 |
| Total mixture | 28,700 | 76,200 | 116,000 | 2.66 |
| % Free arm = 14 | | | | |

The resulting star polymer solution had a viscosity of 635 centipoise when measured using a Brookfield rotating viscometer, #3 spindle, at 100 rpm. The nonvolatile content of the solution was 39.6% confirming the chromatographic determination which had indicated that complete conversion of methacrylate monomers had been achieved. The arms of the star polymers have random hydroxyl groups.

The star polymer was characterized using size exclusion chromatography to give the following molecular weights, including the Z average molecular weight, MZ.

|  | Measurement | | | |
| --- | --- | --- | --- | --- |
|  | Mn | Mw | Mz | d |
| Arm (Prior to attachment to core to form stars) | 7,040 | 8,350 | 9,780 | 1.18 |
| Star | 71,200 | 89,400 | 118,000 | 1.25 |
| Total mixture | 28,700 | 76,200 | 116,000 | 2.66 |
| % Free arm = 14 | | | | |

EXAMPLE 28

Star Polymer Containing 2-Hydroxyethyl Methacrylate from Hydrolysis of Star Made with 2(Trimethylsiloxy)Ethyl Methacrylate This preparation was done in a stirred reactor fitted for distillation.

| Charge: |
| --- |
| I. 900 g of solution prepared in above way |
| II. 150 g isopropyl alcohol |
| 18 g water |
| 3.7 g 10% soln. of n-dodecylbenzenesulfonic acid in isopropyl alcohol |

Procedure:

Part I was charged, then part II was added with stirring over about 5 minutes. The solution was heated to reflux, 75° C., and held at reflux for two hours to complete the removal of the trimethylsiloxy blocking group. Distillation was then begun and 312 g of distillate removed. The gravimetric solids was 47.0% at that time and the viscosity was 6060 centipoise (Brookfield viscometer, #4 spindle, 20 rpm). The solution was thinned to 39.8% solids by the addition of propyleneglycol monomethylether acetate. Th viscosity of the solution was 1090 centipoise (Brookfield viscometer, #3 spindle, 50 rpm).

The star polymer was characterized using size exclusion chromatography to give the following molecular weights:

|  | Measurement | | | |
| --- | --- | --- | --- | --- |
|  | Mn | Mw | Mz | d |
| Arm | 5,890 | 7,220 | 8,390 | 1.23 |
| Star | 66,100 | 87,100 | 120,000 | 1.32 |
| Total mixture | 25,000 | 74,200 | 118,000 | 2.97 |
| % Free arm = 14 | | | | |

The hydroxyl number of the star was found to be 25.8 (solids basis). The expected value was 26.5 indicating that complete hydrolysis had occurred.

The following tough, flexible finish was prepared from the above hydroxyl containing star polymer:

|  |  | Solids |
| --- | --- | --- |
| 100.6 g | above star polymer solution | 40.0 g |
| 31.8 g | neopentyl glycol/1,6-hexanediol/ adipate of 534 Mn | 31.8 g |
| 6.0 g | acetyl acetone | |
| 86.0 g | propylenglycol monomethylether acetate | |
| 1.0 g | polybutyl acrylate flow control agent | 0.5 g |
| 2.0 g | Tinuvin 328 U. V. Screen - Ciba Geigy | 2.0 |
| 1.0 g | Tinuvin 440 Hindered amine antioxidant | 1.0 |
| 0.02 g | dibutyltin dilaurate catalyst | 0.02 |
| To the above mixture was added: | | |
| 31.33 g | "Desmodur" N-3390 isocyanate functional isocyanurate oligomer from Mobay Chemical Corp. | 28.2 |

This finish had a viscosity of 23.4 sec in a #2 Zahn cup, and could be sprayed to a 2.5 mil thick film which after baking 30 minutes at 120° C. had a Knoop hardness of 3.4 and a 20 degree gloss of 85. The film on a flexible ⅛ in (0.32 cm) thick substrate did not crack when it was bent over a ½ in (1.27 cm) rod at −29° C. This is a excellent balance of hardness and flexibility.

EXAMPLE 29

Star Polymer Containing Gamma-Methacryloxypropytrimethoxysilane

This product was made using butyl methacrylate which means its major glass transition temperature will be about 25° C. Its preparation is very similar to the above description, except of course hydrolysis is not necessary.

A three-neck round bottom flask fitted with a mechanical stirrer, a reflux condenser, a rubber septum, a temperature probe and provision for maintaining a dry nitrogen atmosphere was used as the reaction vessel. After baking the equipment overnight in a 100° C. oven, it was cooled and purged with nitrogen. The flask was then charged with the following initial charge:

Initial Charge:
  601 g of tetrahydrofuran*
  602 g of toluene*
  17.4 g 1-trimethylsiloxy-1-methoxy-2-methylpropene To the initial charge was then added via a syringe pump:
  4.5 cc of a solution of 1.5 cc of 1 molar solution of tetrabutylammonium m-chlorobenzoate in acetonitrile mixed with 20 g, of toluene.

The mixture thus obtained was stirred for 15 minutes under dry nitrogen. The remaining catalyst solution and the monomers were then added continuously at a constant rate via syringe pumps or dropping funnels as appropriate according to the following schedule. At the beginning of the first feed, a clock was started and left running to keep track of the feeds and other steps.

The feed compositions and the clock times (in minutes at which the additions of the feed compositions were started and completed were as follows:

| Feed | Composition | Clock Time, Minutes | |
|---|---|---|---|
| | | Started | Completed |
| I | Balance of tetrabutylammonium-m-chlorobenzoate solution described above | 0 | 306 |
| II | 651 g n-butyl methacrylate* 89 g gamma-Methacryloxypropyl-trimethoxysilane**** | 0 | 30 |
| III** | 79.2 g ethyleneglycol di-methacrylate* | 280 | 290 |
| IV*** | 20 g methanol | 330 | 331 |

Notes:
*Dried to less than 10 ppm water using a column packed with 80-200 mesh neutral alumina, Brockman activity 1, 80-200 mesh., Fisher Scientific Co.
**Before this addition, complete conversion of the arm forming monomer was determined using a high pressure liquid chromatograph.
***Terminates the still living silyl enol ether polymerization sites.
****gamma-Methacryloxypropyltrimethoxysilane was obtained from Carbide Chem. Co., as A174.

During the reaction the temperature rose to 40° C. at 56 minutes into the time sequence. The temperature was held at 34°-36° C. with external cooling until 120 minutes into the reaction. Cooling was no longer necessary at that time and the temperature dropped to 24° C. at 280 minutes at which time the ethyleneglycol dimethacrylate was added. The conversion of the monomers as determined by liquid chromatography was used to follow the reaction to decide when arm formation was complete and the core monomer (ethyleneglycol dimethacrylate in this example) could be added.

The resulting star polymer solution had a viscosity of 234 centipoise when measured using a Brookfield rotating viscometer, #2 spindle, 100 rpm. The nonvolatile content of the solution was 39.2% confirming the chromatographic determination which had indicated that complete conversion of methacrylate monomers had been achieved.

The star polymer was characterized using size exclusion chromatography to give the following molecular weights:

| | Measurement | | | |
|---|---|---|---|---|
| | Mn | Mw | Mz | d |
| Arm | 12,100 | 15,800 | 19,100 | 1.31 |
| Star | 183,000 | 254,000 | 380,000 | 1.39 |
| Total mixture | 53,000 | 213,000 | 375,000 | 4.01 |
| % Free arm = 16 | | | | |

EXAMPLE 30

Advantage of a Star Polymer When Compared To a Linear Polymer of Similar Molecular Weight The linear polymer for this example was also prepared by group transfer polymerization. After hydrolysis to remove the blocking group the polymer had the following characteristics:

Composition: Ethyl methacrylate/methyl

-continued methacrylate/hydroxyethyl methacrylate(46.64/46.64/6.72)
Hydroxyl # = 28.8
% solids = 39.4
Viscosity = 2688 centipoise, 4 spindle, 50 rpm, Brookfield viscometer
Mn = 57,000, Mw = 135,000, Mz = 379,000. d = 2.34

Two star polymers were used for comparison. They differed in hydroxyl content, and to some degree in molecular weight. The lower hydroxyl content star seems to offer the best comparison, particularly when comparing on the basis on Mw equivalency. The data given is that for the star since the free arm contributes very little to the viscosity of the solution

| | Star I (A) | Star II (B) | Linear polymer above (C) |
|---|---|---|---|
| Mn | 64,400 | 122,000 | 57,000 |
| Mw | 93,800 | 177,000 | 135,000 |
| Mz | 149,000 | 278,000 | 379,000 |
| Solution Viscosity | 268 cp., (39.4% solids) | 585 cp., (40.2% solids) | 2688 cp., (39.4% solids) |
| OH# = | 22 | 13 | 28.8 | viscosity of melamine resin crosslinked polyester diol blend enamels enamels containing 40% of the above acrylics, measured using bubble tube method:

| (A) | (B) | (C) |
|---|---|---|
| 0.89 Stokes | 1.08 Stokes | 11.25 Stokes |

These values demonstrate that enamels containing star polymers have substantially lower viscosity than enamels made from linear polymers of similar molecular weight. Lower viscosity means that the coatings can be desirably applied at higher solids content levels.

The cured film properties showed that all the enamels had similar film properties except that enamel B showed slight whitening when severely deformed by impact indicating less coreaction with the melamine and polyol. This is what might be expected because of its lower hydroxyl content which could give a lower extent of reaction with the balance of the mixture.

EXAMPLE 31

Preparation of Soft Siloxane

In this experiment at isocyanate terminated polyesterurethane is capped with gamma-aminopropyl-triethoxysilane (A-1100, Carbide Chemical Co.). Because the polyesterurethane has a low $T_g$ (est. −60° C.) it self cures to an elastomer when reacted with atmospheric moisture under the influence of an acid catalyst. Modification with a high $T_g$ hydroxyl functional acrylic star polymer produces flexible, moderately hard coatings.

| Part 1: | |
|---|---|
| 260 g. | neopentyl glycol/1,6-hexanediol/adipate of 1100 Mn (99 hydroxy number-OH#), containing 441.2 miliequivalents of hydroxyl |
| 440 g. | Toluene |

Dry by heating at reflux for 15 minutes in a reactor fitted with a water separator. Cool to 50° C. under nitrogen and add over about 3-5 minutes:

| Part 2: | |
|---|---|
| 92.68 g. | of Trimethyl-hexamethylene diisocyanate (containing 882.35 milliequivalents of isocyanate). This material is a commercially available mixture which contains approximately equal parts of 2,2,4-trimethyl-hexamethylene diisocyanate and 2,4,4-trimethyl-hexamethylene diisocyanate. |

Heat the mixture of Parts 1 and 2 at reflux (117°-120° C.) for 2 hours. With the reactor heating discontinued, add over about 15 minutes:

Part 3:

98.00 g. gamma-aminopropyltriethoxysilane

The resulting solution contained 49.45% nonvolaties of siloxane terminated urethane. The infrared spectrum showed that all the isocyanage had been consumed. The solution viscosity was 1.37 Stokes (F-¼ on the Gardner Holt scale).

EXAMPLE 32

Film Preparation 40 parts star polymer containing 42% methyl methacrylate, 42% ethyl methacrylate, 6% hydroxethyl methacrylate and 10% ethylene glycol dimethacrylate as a 41% solids solution in toluene 60 parts siloxy terminated polyurethane of Example 31

0.05 parts surface tension control agent (50 centistokes polydimethyl siloxane fluid)

1.0 part phenyl acid phosphate catalyst

Toluene sufficient to produce a 40% nonvolatile content solution.

Films were knife coated using a 10 mil blade on glass and on a flexible polyurethane plastic. The films were then cured at 70° C. for 1 hour in an oven containing a tray of water to provide water vapor.

The film resulting slightly hazy 3.1 KHN film passed 50 methy ethyl ketone (MEK) rubs and the sample on 0.32 cm thick flexible polyurethane plastic sheet could be bend around a half inch rod at −29° C. without cracking. This demonstrates its suitability for use as a coating for flexible plastic.

Coatings on the flexible plastic which contained either 30 or 50% star passed the ½" bend test at 23° C. and were even more MEK resistant. The film which contained 50% star had a KHN of 4.3.

I claim:

1. A blend of at least two polymers, comprising about, by weight of blend solids,
    (A) 10–60% of at least one acrylic star polymer comprising a crosslinked core which comprise
        (i) a polymer derived from a mixture comprising
            (a) 1–100% by weight of one or more monomers, each having at least two groups, $$-Z'-\overset{O}{\overset{\|}{C}}-\overset{R}{\overset{|}{C}}=CH_2, \text{ and}$$

(b) 0–99% by weight of one or more monomers, each having one group $$-Z'-\overset{O}{\overset{\|}{C}}-\overset{R}{\overset{|}{C}}=CH_2, \text{ and}$$

(ii) attached to the core, at least 5 arms comprising polymer chains derived from one or more monomers, each having one group, $$-Z'-\overset{O}{\overset{\|}{C}}-\overset{R}{\overset{|}{C}}=CH_2$$

in each of which R is the same or different and is H, $CH_3$, $CH_3CH_2$, CN or $CO_2R'$ and Z' is O or NR', wherein R' is $C_{1-4}$ alkyl,
    wherein
        said arms contain reactive functional groups in an amount of at least about one such group per arm on the average, said star polymer having a primary glass transition temperature above 20° C.;
    (B) 15–60% of at least one matrix-forming polymer selected from polyester, polyether, polyurethanes, and polysiloxanes different than that of polymer (A) and having a primary glass transition temperature below 10° C., a number average molecular weight of at least about 500, and a functionality of at least 2; and
    (C) said blend having crosslinking capability, either in polymers (A) and (B), or in a third, crosslinking polymer.

2. The blend of claim 1 wherein the difference in primary glass transition temperature between polymers (A) and (B) is at least 45° C., and polymer (B) has a number average molecular weight less that about 3000.

3. The blend of claim 1 wherein the reactive functional groups of (A) comprise hydroxyl groups, with a hydroxyl number within the range of 8 to 120.

4. The blend of claim 3 wherein the hydroxyl groups are located randomly through the length of the arms.

5. An enamel paint wherein the vehicle comprises a polymer blend of claim 1 suspended or dissolved in suitable solvents, wherein (C) is 10–30% of a nitrogen-bearing crosslinking resin selected from polyisocyanate and melamine-formaldehyde resin.

6. A substrate coated with the enamel of claim 5.

7. The enamel of claim 5 wherein (C) is 10–30% of a nitrogen-bearing crosslinking resin.

8. The enamel of claim 7 wherein the crosslinking resin is a polyisocyanate.

9. The enamel of claim 7 wherein the crosslinking resin is a melamine-formaldehyde resin.

10. The enamel of claim 5 wherein the number average molecular weight of polymer (B) is less than about 2000 and the hydroxyl number is at least about 50.

11. A film wherein the polymer content comprises the polymer blend of claim 1.

12. A molding resin wherein the polymer content comprises the polymer blend of claim 1.

13. A consolidated body wherein the polymer content comprises the polymer blend of claim 1.

14. The blend of claim 1 wherein acrylic star polymer (A) is made by group transfer polymerization.

15. The blend of claim 14 wherein acrylic star polymer (A) is made by an arm/core process comprising
    (A) preparing a "living" polymer by reacting a group transfer initiator with one or more monomers having a carbon-carbon double bond polymerizable by a group transfer polymerization process;

(B) contacting the resulting "living" polymers with a mixture comprising
  i. 1-100% by weight of a monomer having at least two carbon-carbon double bonds polymerizable by a group transfer polymerizable process and
  ii. 0-99% by weight of a monomer having one carbon-carbon double bond polymerizable by a group transfer polymerization process.

16. The blend of claim 1 wherein polymer (B) has a backbone of polyester, polyether or polyurethane, polymer.

* * * * *